Nov. 22, 1955  G. BORGEAUD  2,724,346
AXLE BOXES RESILIENTLY YIELDABLE AXIALLY
Filed Sept. 19, 1951
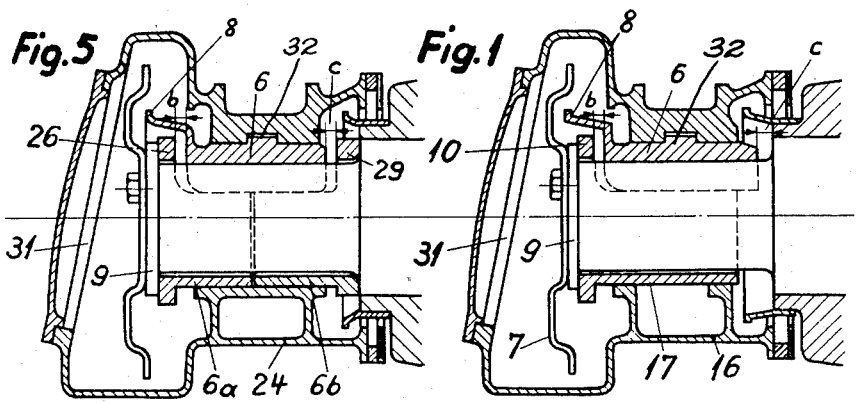
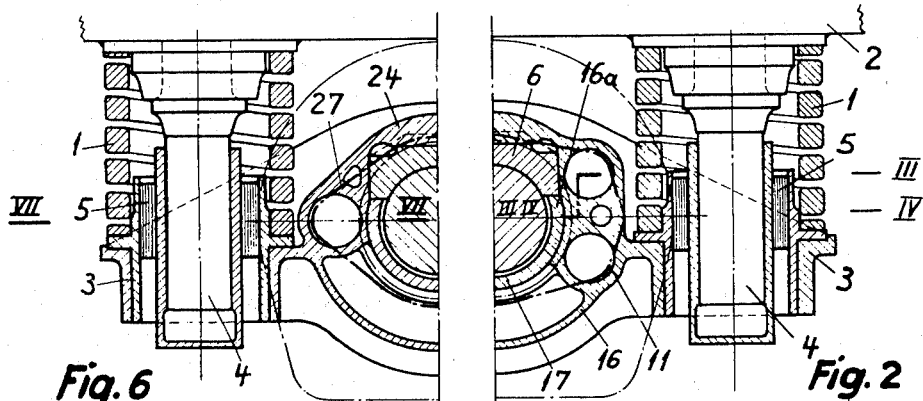
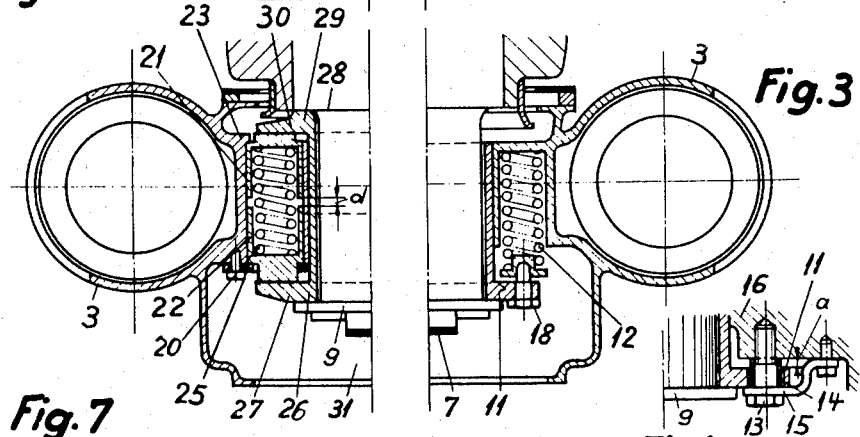
GASTON BORGEAUD INVENTOR.
BY *[signature]*
HIS ATTORNEY

United States Patent Office 2,724,346
Patented Nov. 22, 1955

2,724,346

AXLE BOXES RESILIENTLY YIELDABLE AXIALLY

Gaston Borgeaud, Winterthur, Switzerland, assignor to Schweizerische Lokomotiv- und Maschinenfabrik, Winterthur, Switzerland Application September 19, 1951, Serial No. 247,207

Claims priority, application Switzerland September 22, 1950

16 Claims. (Cl. 105—222)

The instant invention relates to axle boxes, particularly, for railway rolling stock, in which means to accommodate for axial thrusts encountered on motion of the vehicles are required. More particularly it relates to axle boxes of the type in which the bearing itself is non-displaceable axially and the accommodation is between the axle journal and the axle box housing.

An object of the invention is to provide an axle box in which means are provided for taking up axial thrusts with a minimum likelihood of having the axle and the bearing freeze or bind.

Still a further object is to provide a resiliently axially yieldable bearing structure in which ample provision for lubrication is made.

Still a further object is to provide means for absorbing axial thrusts in which the bearing plays no part in the transmission thereof from the axle to the axle box.

Axially yieldable bearings are known in which the axle box housing is axially slidable on the bearing and in which restoring springs are interposed between the box and the bearing to restore them to their normal midposition. This mode of construction has the disadvantage that, the axle box and bearing being subjected to the whole of the load, the supporting faces thereof which slide on each other move but slightly under the axial thrusts and, even with the best of lubrication, readily tend to corrode and wear away. In addition, the spring elements of such structures are not readily accessible. In another prior known type, the bearing is non-displaceably connected to the axle box, and the axial sliding thus takes place on the journal itself. In such type the disadvantage is that the springs must be positioned between the ends of the spindle and the cover of the axle box. Hence the latter is subjected to rather appreciable lateral thrusts of the axle and must accordingly be powerfully dimensioned.

In a third prior known type, which like the second type has an axially non-displaceable bearing within the axle box, an axle spindle flange, which the bearing abuts, is axially displaceable outwardly and acts against a centrally positioned spring bearing against the outer end of the spindle. The displaceable axle spindle flange is rotatably rigid with the lengthened axle spindle by means of a slide key and groove. Such arrangement has, however, the disadvantage that the axial thrusts, acting on the displaceable flange by way of the journal, act eccentrically on the flange so that binding may take place between the displaceable flange and the end of the spindle. Undesired also, in many examples of this type, is the arrangement of the restoring spring on the lengthened spindle, for the space so taken could be used more advantageously if available for other structural parts, such as an oil ring or the drive for a speed indicator.

I accomplish the foregoing, and other obvious, objects in the axle box of the instant invention and avoid the disadvantages of the prior known types, by employing a non-displaceable bearing within the axle box, in generally the manner of the third prior known type above discussed, and dispose between the bearing and a shoulder of the axle spindle an intermediate ring which is secured against rotation and which is provided with lateral lobes, bracing the lateral lobes resiliently by springs in the axial direction against the axle box. As a result of such an arrangement of the lateral thrust transmission means, the axial thrusts are transmitted by the intermediate ring directly from the particular spindle shoulder to the axle box, and the bearing per se does not participate in such transmission.

The features of the bearing box of the invention will be understood more fully and clearly from the following description of two illustrative embodiments thereof in conjunction with the appended drawings in which Fig. 1 is an elevational section parallel to the axle of the first illustrative embodiment of the invention using a single intermediate ring, Fig. 2 the vertical cross-section of half of said first embodiment taken through the axes of the bearing box support pins, Fig. 3 is a horizontal cross-section of half the first embodiment along line III—III of Fig. 2, Fig. 4 is a partial section along line IV—IV of Fig. 2, Fig. 5 is an elevational section parallel the axle of the second embodiment having two intermediate rings, Fig. 6 is the vertical cross-section of half the second embodiment taken through the axes of the bearing support pins, and Fig. 7 is a horizontal cross-section of half the second embodiment taken along line VII—VII of Fig. 6.

In both illustrative embodiments, the axle box is of type in which the load is taken up by compression springs 1 positioned between the vehicle frame 2 and the lateral arms 3 of the axle box, the springs encircling the box guide pins 4 projecting from the vehicle frame. The rubber bushing 5 about each support pin permits a certain general yielding of the axle box in respect of the guide pins with the result that slight variations in the inclination of wheel pairs to the vehicle frame, which occur during motion of the vehicle, will not bring about any binding of the axle box to its support pins. The mode of supporting the axle box on the axially non-displaceable bearing 6 housed therewithin, for example by an extension of the bearing into the groove 32, and the rotary lubricating device consisting of the double-ended scooped dipper 7 and the oil catcher lip 8, are also the same in both illustrative embodiments.

In the illustrative embodiment of Figs. 1 to 4, the apparatus for transmitting the axial thrusts consists of an intermediate ring 10, which is interposed between the bearing 6 and the removable axle end plate 9 having two integral lateral lobes 11, the two pairs of compression springs 12 which are housed in recesses in the axle box and press against the respective lobes 11, and the two stop devices for the intermediate ring shown in Fig. 4. Each of the stop devices consists of a threaded bolt 13 about which is positioned a spacing bushing 14, both of which pass through the respective lobe 11, the bolt being screwed down, against a springy elbow 15 affixed to the housing of the axle box, into said housing 16, and thus limits the distance which the intermediate ring may move away from the housing to a predetermined maximum value. The length of the spacing bushing 14 is selected so that the necessary play between intermediate ring 10 and plate 9 is preserved. The intermediate ring 10 is secured against rotation in that it, preferably, is integral with the cut down bush 17, which in turn extends the bearing 6 with both its raised ends 16a.

When an axial thrust occurs directed inwardly from the axle end plate 9, the intermediate ring 10 together with the bush 17 is pushed inwardly and transmits the thrust elastically by springs 12 to the axle box housing 16. The maximum spring compression is predetermined by the distance "a" (see Figure 4) between the lateral lobes 11 and the stop surface of housing 16, in which connection the initial tension of springs 12 may be altered by adjusting the set screws 18 passing through the portions of lobes 11 engaged by the springs. It is to be noted that with this mode of thrust transmission, the bearing 6 carrying the load does not participate therein at all, that is, the axial thrust is transmitted by the intermediate ring directly to the axle box housing. In such thrust transmission the entire frontal area of the intermediate ring acts as the bearing surface, not merely the portions of such frontal area adjacent the cut down bush. The distance "b" (see Figure 1) between the outer frontal surface of the bearing 6 and the intermediate ring 10 for this reason is made large enough that the bearing, even on maximum displacement of ring 10, still does not abut ring 10.

When an axial thrust occurs in the opposite direction, the thrust transmission is by way of the axle box housing of the bearing positioned at the opposite end of the axle of the particular pair of wheels, the bearing on this side transmitting no axial force. There results essentially an outwardly directed axial displacement, corresponding to the spring bias, of the axle spindle within the bearing in the opposite axle box in which the end plate 9 moves away from the intermediate ring 10. In this case, the bearing 6 still does not strike the journal shoulder for the distance "c" (see Figure 1) is also greater than the maximum displacement.

In the second illustrative embodiment, shown in Figs. 5 to 7, the apparatus for transmitting axial forces is double sided and operative in both directions. Each of the two axle bearings of a pair of wheels absorbs the axial thrust in either direction, and the thrust force in each case is divided approximately equally between the two axle boxes of the wheel pair. The force transmitting springs need therefore be able to take up only half the force of the thrust, or, with equal dimensioning as compared to those used in the first illustrative embodiment, half the number of springs in each bearing suffice. In the instant illustrative embodiment, the latter premise is made the basis of the design and but a single spring 20 is employed in each lateral side of the box. To enable actuation in both directions axially, each of the springs 20 is held in two bushings, 21 and 22, of which the inner one abuts a shoulder 23 of the axle box housing 24 while the outer one 22 abuts a stop plate 25 fastened to the housing. The outer intermediate ring 26, which lies against and adjacent the spindle end plate 9, has two lateral lobes 27, one to either side, against which the top of the respective bushing 22 is spring pressed. The inner intermediate ring 29, abutting the journal shoulder 28, is similarly spring pressed through its two lateral lobes 30 by the tops of bushings 21. Both intermediate rings are connected with a respective half, 6a, and 6b, of the cut down bush which halves touch each other at about the middle of the axle spindle and rest against the bearing 6, whereby rotation of the intermediate rings is prevented.

Now, when an axial thrust is transmitted from the axle to the bearing, one or the other of each pair of bushings is tensioned depending on the direction of the thrust, the two opposite bushings remaining at rest, and the spring pressure is transmitted to the axle box housing. The axial thrust is thus also transmitted in this embodiment from the axle to the axle box without calling upon the bearing 6, for the distances "b" and "c" between the ends of the bearing and the respective rings are greater than the distance "d" (see Figure 7) between the inner ends of the two spring bushings 21 and 22, which last interval determines the maximum compression in both axial directions. An adjustable stop for the outer ends of the springs can be provided similar to that shown in Fig. 4 for the first embodiment, if desired or required.

In the event of spring breakage, the particular spring can be quickly removed and replaced without dismantling the bearing by removing the journal end plate 9 from the end of the journal and in the second embodiment removing stop plate 25, whereupon the outer intermediate ring 27 or 10, is removed and the particular spring or springs, 22 or 12, may readily be taken out through the opening 31 in the axle box housing. Thus for such purpose of maintenance and repair, the bearing 6 need not be dismantled.

As a result of the symmetrical construction of the axial thrust transmission device of the instant invention, the parts thereof which slide on each other, as for example the guide faces of the cut down bush and the spring bushings in their bores, are subjected but to small or very minute variable loads. Furthermore in both illustrative embodiments, adequate lubricating oil is available for, as above stated, lubrication of the device is provided by the rotating oil dipper 7.

The instant invention is obviously applicable to other axle box types than those incorporated in the two illustrative embodiments, as to those with curved box supporting face of the bearing or as to those with horn block axle box guides and waste lubricators. Furthermore the axle box may take the form of an inside axle box in which case the housing thereof may preferably be made in two parts rather than the single housing casting shown.

What I claim is:

1. An axial thrust transmission device comprising a rotatable axle, a bearing about an end region of the axle, a formed housing enclosing the end region of the axle and the bearing, the housing being rigidly connected axially to the bearing, means supporting the housing and securing it against rotation, a plate of a diameter greater than the diameter of the axle affixed to the end of the axle within the housing, the plate being at a predetermined distance axially from the nearer end face of the bearing and at a distance from the inner surface of the housing substantially greater than the predetermined distance, an intermediate axially displaceable ring on the axle and anchored against rotation between the end plate and the said nearer end face of the bearing and of a width less than the said predetermined distance, a pair of substantially diametrically opposite lobes integral with the intermediate ring, and spring means anchored in the housing and bearing against the lobes to press the ring against the plate and adapted on occurrence of axial thrusts to restore the lobes and axle to their original relative position.

2. An axial thrust transmission device according to claim 1, in which a stop limiting the axial outward travel of the lobes is affixed to the housing and is of such magnitude that the maximum inward axial motion of the intermediate ring is limited to a distance less than the residual portion of the predetermined distance between the end plate and the nearest end face of the bearing not occupied by the width of the ring.

3. An axial thrust transmission device according to claim 1, in which the intermediate ring is integral with a cut down bush axially displaceable relative the housing and the bearing.

4. An axial thrust transmission device comprising a rotatable axle, a bearing about an end region of the axle, a formed housing enclosing the end region of the axle and the bearing, the housing being rigidly connected to the bearing, means securing the housing against rotation, a plate of a diameter greater than the diameter of the axle affixed to the end of the axle within the housing, the plate being at a predetermined distance axially from the nearest end face of the bearing and at a distance from the inner surface of the housing substantially greater than the predetermined distance, an intermediate axially displaceable first ring on the axle anchored against rotation between the end plate and the nearer end face of the bearing and of a width less than the predetermined distance, a first pair of substantially diametrically opposite lobes integral with the first ring, a shoulder on the axle beyond the inner end of the bearing at an axial distance therefrom substantially the equal to the predetermined distance, a second intermediate ring axially displaceable on but anchored against rotation with the axle between the shoulder and the bearing and of a width less than the predetermined distance, a second pair of diametrically opposite lobes integral with the second ring, each lobe of the second pair being aligned with a lobe of the first pair, and spring means braced between the first and second lobe pairs pressing each of the first and second rings against the plate and shoulder respectively and adapted on occurrence of axial thrusts displacing the axle inwardly or outwardly to restore the position of the first pair of lobes and the first ring and of the second pair of lobes and the second ring relative to the axle to the original position.

5. An axial thrust transmission device according to claim 4 in which the bearing has an upper and a lower bush, the lower bush consisting in turn of two halves each axially displaceable relative to the housing and the upper bush, the first intermediate ring being integral with the half of the lower bush nearest the end of the axle, the second intermediate ring being integral with the half of the lower bush nearer the shoulder, and a stop on the housing for each lobe for limiting the travel of each ring away from the more adjacent end face of the bearing.

6. An axial thrust transmission device for a vehicle comprising a rotatable axle, a bearing consisting of an upper and a lower half about an end region of the axle, a formed housing enclosing the end region of the axle and the bearing, the housing being rigidly connected axially to the upper half of the bearing and supported from the vehicle resiliently in the vertical direction while secured against rotation, a plate of a diameter greater than the diameter of the axle affixed to the end of the axle within the housing and at a predetermined distance axially from the outer end face of the bearing, an intermediate ring about and displaceable on the axle between the end plate and the outer end face of the upper half bearing and of a width less than the predetermined distance, a pair of substantially diametrically opposite lobes integral with the intermediate ring and extending substantially parallel to the horizontal axis of the housing, the intermediate ring being integral with the lower half bearing, the lower half bearing being axially displaceable with respect to the upper half bearing, a pair of compression springs for each lobe of the pair and extending substantially parallel the axle to press the respective lobe and the ring against the plate in opposition to axial thrusts, and a stop anchored in the housing for each lobe to limit the compression of each spring to a distance less than the predetermined distance.

7. An axial thrust transmission system according to claim 6, in which the stop is adjustable and comprises an elbow of which a first arm is affixed to the housing and a second arm rests against the outer face of the intermediate ring, an adjusting screw passing through the second arm and the intermediate ring and is threaded into the housing, and a spacer bushing between the housing and the second elbow arm.

8. An axial thrust transmission device according to claim 6, in which the housing has an outer removable cover which in position is substantially vertical and which is of such size that on removal ready access to the end plate, the intermediate ring and each spring of the two pairs is provided for replacement thereof.

9. An axial thrust transmission device for a vehicle, comprising a rotatable axle, a bearing about an end region of the axle, a cut down bush engaging the bearing, the cut down bush consisting of an inner axial half and an outer axial half, each half bush portion being axially displaceable with respect to the housing and the bearing, a shoulder on the axle beyond the inner face of the bearing, a formed housing enclosing the end region of the axle, the shoulder and the bearing, the housing being rigidly connected to the bearing axially, means for supporting the housing resiliently in the vertical direction and securing the housing against rotation with an axis of the housing substantially horizontal, a plate of a diameter greater than the diameter of the axle affixed to the end of the axle within the housing and at a predetermined distance axially from the outer end face of the bearing, the inner end face of which being at substantially the same predetermined distance axially from the shoulder, a first intermediate ring about and axially displaceable on the axle between the end plate and the outer end face of the bearing and of a width small as compared to the predetermined distance, a second intermediate ring about and axially displaceable on the axle between the shoulder and the inner end face of the bearing and of a width small as compared to the predetermined distance, the first intermediate ring being integrally connected with the outer bush half and the second intermediate ring being integrally connected with the inner bush half, a pair of substantially diametrically opposite lobes integral with each intermediate ring respectively and extending substantially parallel the horizontal axis of the housing, a bore in the housing for each lobe and extending substantially parallel the axle from a lobe of the first ring to the corresponding lobe of the second ring, a pair of hollow cylinders closed at one end and slidable in the bore, each hollow cylinder having its closed end facing a lobe and having a cylindrical wall of an overall length which is substantially half the distance between the facing surfaces of the corresponding lobes of the first and second rings less one-half of a distance less than the predetermined distance, and a compression spring between and within the pair of hollow cylinders to engage the closed end of each hollow cylinder resiliently with its corresponding lobe.

10. An axial thrust transmission device according to claim 9, in which a stop is affixed to the housing for each lobe to limit the compression of each spring to a distance less than the predetermined distance which lesser distance is substantially equal to the distance between the open end of a pair of the hollow cylinders in a bore when not transmitting an axial thrust.

11. An axial thrust transmission device according to claim 9, in which the housing has an outer removable cover which in position is substantially vertical and which is of such size that on removal permits of ready access to the end plate, the first ring, and the springs.

12. An axial thrust transmission device comprising a housing, an axle bearing within the housing, the housing being supported axially stable on the bearing, a rotatable axle extending through the bearing and having at least a first shoulder member at a portion thereof within the housing and spaced from the bearing, a non-rotatable ring about the axle between the shoulder member and the axial end of the bearing nearest the shoulder member and adapted to be axially displaced, means limiting the maximum axial displacement of the ring, means securing the ring against rotation, and resilient means bearing on the ring to engage it to the shoulder member and restoring the axle to a predetermined position on displacement from the predetermined position by axial thrusts.

13. An axial thrust transmission device according to claim 12 in which the ring is integral with a cut down bush axially displaceable relative the housing and the bearing and the means securing the ring against rotation are integral extensions on the bush slidingly supported against the bearing.

14. An axial thrust transmission device according to claim 12 in which the ring is adjacent the outer axial end of the bearing and the means for limiting the maximum displacement comprises a pair of lugs integral with the ring, a bore in each lug, a bolt through each bore embedded in a portion of the housing wall, a bushing in each bore of the lugs about the bolts of a length exceeding the width of the ring by a predetermined amount, one end of the bushing abutting the housing, the ring being slidable on the bushing, and a spring elbow having one end anchored in the housing wall and its other end bearing against the other end of the bushing.

15. An axial thrust transmission device according to claim 12 in which the first shoulder is adjacent and spaced from the outer axial end of the bearing, the axle has a second shoulder adjacent and spaced from the inner axial end of the bearing but still within the housing, a second axially displaceable ring between the second shoulder and the inner axial bearing end, and the resilient means acts on both the first and the second rings to engage each ring to its respective shoulder.

16. An axial thrust transmission device according to claim 12 in which the first shoulder is adjacent and spaced from the outer axial end of the bearing, the axle has a second shoulder adjacent and spaced from the inner axial end of the bearing but still within the housing, a second axially displaceable ring between the second shoulder and the inner axial bearing end, each ring being integral with an individual cut down bush axially displaceable relative the bearing and the housing, the adjacent ends of the cut down bushes being spaced from each other a distance in excess of the maximum axial displacement of each ring, and the resilient means acts also on the second ring to engage it to the second shoulder tending to maintain the axle in the predetermined position axially of the housing.

References Cited in the file of this patent

UNITED STATES PATENTS

| | | |
|---|---|---|
| 547,472 | Adams | Oct. 8, 1895 |
| 1,071,989 | Dehu | Sept. 2, 1913 |
| 1,141,667 | Thompson | June 1, 1915 |
| 1,725,310 | Stedefield | Aug. 20, 1929 |
| 1,946,439 | Heller | Feb. 6, 1934 |
| 2,249,596 | Blackmore | July 15, 1941 |

FOREIGN PATENTS

| | | |
|---|---|---|
| 432,769 | Great Britain | Aug. 1, 1935 |